United States Patent
Bizzarri et al.

(10) Patent No.: US 12,477,356 B2
(45) Date of Patent: Nov. 18, 2025

(54) TELECOMMUNICATION SYSTEM AND METHOD FOR RECONFIGURING IT

(71) Applicant: TELECOM ITALIA S.p.A., Milan (IT)

(72) Inventors: Simone Bizzarri, Turin (IT); Andrea Buldorini, Turin (IT); Andrea Schiavoni, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 590 days.

(21) Appl. No.: 17/637,375

(22) PCT Filed: Sep. 18, 2020

(86) PCT No.: PCT/EP2020/076077
§ 371 (c)(1),
(2) Date: Feb. 22, 2022

(87) PCT Pub. No.: WO2021/053129
PCT Pub. Date: Mar. 25, 2021

(65) Prior Publication Data
US 2022/0330046 A1    Oct. 13, 2022

(30) Foreign Application Priority Data
Sep. 18, 2019    (IT) .................. 102019000016640

(51) Int. Cl.
*H04W 24/02*    (2009.01)
*H04L 43/0852*    (2022.01)
(Continued)

(52) U.S. Cl.
CPC ......... *H04W 24/02* (2013.01); *H04L 43/0852* (2013.01); *H04W 24/08* (2013.01);
(Continued)

(58) Field of Classification Search
CPC ..... H04W 24/02; H04W 24/08; H04W 24/10; H04W 28/0268; H04W 72/566;
(Continued)

(56) References Cited

U.S. PATENT DOCUMENTS 9,730,135 B1 *   8/2017   Rahman ................ H04W 24/02
11,119,626 B1 *   9/2021   Duneja ................. G06Q 20/14
(Continued)

FOREIGN PATENT DOCUMENTS

EP    3 026 950 A2    6/2016

OTHER PUBLICATIONS

3rd Generation Partnership Project; Technical Specification Group Services and System Aspects; Study of Enablers for Network Automation for 5G, V16.2.0 Jun. 2019, henceforth "3GPP_TR23.791" (Year: 2019).*

(Continued)

*Primary Examiner* — Chuong M Nguyen
(74) *Attorney, Agent, or Firm* — Oblon, McClelland, Maier & Neustadt, L.L.P.

(57) ABSTRACT

A telecommunication system monitors, for a plurality of services, a number of service requests from users and quality of service perceived by the users while using the services. A self-organizing network module determines a correlation between at least one configuration parameter, the number of service requests and the quality of service perceived, and, based on the correlation, a target number of service requests, and a target quality of service, determines an updated value for the at least one configuration parameter. Then the self-organizing network module commands the telecommunication system to implement reconfiguration thereof based on the updated value of the at least one configuration parameter.

13 Claims, 2 Drawing Sheets

(51) Int. Cl.
  *H04W 24/08* (2009.01)
  *H04W 24/10* (2009.01)
  *H04W 28/02* (2009.01)
  *H04W 72/566* (2023.01)

(52) U.S. Cl.
  CPC ....... *H04W 24/10* (2013.01); *H04W 28/0268* (2013.01); *H04W 72/566* (2023.01)

(58) Field of Classification Search
  CPC ............. H04L 43/0852; H04L 41/0823; H04L 41/0886; H04L 41/5025
  See application file for complete search history.

(56) References Cited

U.S. PATENT DOCUMENTS

| | | | | |
|---|---|---|---|---|
| 11,792,672 B2* | 10/2023 | Yao | ....................... | H04W 16/02 370/252 |
| 11,950,151 B2* | 4/2024 | Chou | .................... | H04W 24/02 |
| 2015/0033305 A1* | 1/2015 | Shear | .................. | G06F 21/6245 726/11 |
| 2016/0157252 A1* | 6/2016 | Lu | ......................... | H04W 24/02 370/329 |
| 2016/0218912 A1* | 7/2016 | Vincze | .................... | H04L 41/40 |
| 2017/0064591 A1* | 3/2017 | Padfield | ............ | H04W 36/0088 |
| 2018/0144380 A1* | 5/2018 | Herken | ................ | H04L 63/0428 |
| 2020/0076709 A1* | 3/2020 | Stenberg | ............. | H04L 67/1008 |
| 2021/0029577 A1* | 1/2021 | Makinen | ........... | H04W 28/0268 |

OTHER PUBLICATIONS

3GPP_TR23.791 "3rd Generation Partnership Project; Technical Specification Group Services and System Aspects; Study of Enablers for Network Automation for 5G", V16.2.0 Jun. 2019 (Year: 2019).*

International Search Report mailed on Dec. 18, 2020 in PCT/EP2020/076077 filed on Sep. 18, 2020 (5 pages).

Written Opinion mailed on Dec. 18, 2020 in PCT/EP2020/076077 filed on Sep. 18, 2020 (8 pages).

3rd Generation Partnership Project; Technical Specification Group Services and System Aspects; Study of Enablers for Network Automation for 5G (Release 16); 3GPP TR 23.791 v16.2.0; Technical Report; Jun. 11, 2019; 3GPP TR 23.791, 3rd Generation Partnership Project (3GPP); Mobile Competence Centre; France, XP051753968, total 133 pages.

European Office Action issued Mar. 28, 2023 in European Patent Application No. 20788990.8, 5 pages.

* cited by examiner

TELECOMMUNICATION SYSTEM AND METHOD FOR RECONFIGURING IT

BACKGROUND OF THE INVENTION

Field of the Invention

The present invention generally relates to a telecommunication system. More particularly, the present invention relates to a telecommunication system having self-reconfiguration capabilities.

Overview of the Related Art

With the increase of services deliverable by a telecommunication system, telecommunication system operators are becoming more and more interested in determining customer experience (quality of experience) and performance of the telecommunication system (quality of service) while delivering the services.

The quality of experience has been defined by ITU-T SG12 (2007) as "the overall acceptability of an application or service, as perceived subjectively by the end user", and it is related to the specific service delivery. It is defined by qualitative indicators influenced by total end-to-end effects on the communication system, as well as user expectations and degree of delight or annoyance during the fruition or use of a service.

The Quality of Service is considered as "the ability of the network to provide a service at a guaranteed performance level". It is assured by the differentiated management of the various traffic classes, and it is a technical, objective and network oriented entity, mathematically expressed by network parameters, obtained by monitoring operations on the network. These parameters, defined by standardization organizations, do not depend on the service under monitoring.

Currently, in a telecommunication system, configuration parameters such as radio resources to be dedicated to the delivery of the services, are based on measurements or estimates of the quality of experience and/or of the quality of service.

SUMMARY OF INVENTION

The Applicant has found that the solutions known in the art, which are all based on a same conventional approach, are not satisfactory. The conventional approach does not question or examine if there is a correlation between the quality of experience and/or the quality of service of each service on one side, and service requests performed by the users of the telecommunication system to access and enjoy such a service, on the other side.

Contrary to this conventional approach, the Applicant has understood that a telecommunication system may be considered as a negative (or balancing) feedback system (i.e., a self-regulating system) where the feedback is provided by the users and their service requests.

Based on this understanding, the Applicant has devised a telecommunication system capable of taking into account the quality of experience perceived by the users and an impact thereof on subsequent service requests, and to dynamically perform a corresponding self-reconfiguration.

One or more aspects of the present invention are set out in the independent claims, with advantageous features of the same invention that are indicated in the dependent claims, whose wording is enclosed herein verbatim by reference (with any advantageous feature being provided with reference to a specific aspect of the present invention that applies mutatis mutandis to any other aspect).

More specifically, an aspect of the present invention relates to a telecommunication system configured to deliver a plurality of services. The telecommunication system preferably comprises a monitoring module configured to monitor, preferably for each service of said plurality of services, a number of service requests submitted by users of the telecommunication system to access said service, and preferably a quality of experience perceived by the users while using said service.

The telecommunication system preferably comprises a self-organizing network module preferably configured to, based on a current value of at least one configuration parameter of the telecommunication system, and on the monitored number of service requests and the monitored quality of experience, determine a correlation between the quality of experience, the at least one configuration parameter and the number of service requests. Preferably, the self-organizing network module is also configured to, based on said correlation, and on at least one between a target number of service requests submitted by users of the telecommunication system to access said service and a target quality of experience accepted to be perceived by the users while using said service, determine an updated value of the at least one configuration parameter, and command the telecommunication system to implement a reconfiguration thereof according to said updated value of the at least one configuration parameter.

According to an embodiment, additional or alternative to any of the preceding embodiments, the self-organizing network module is configured to determine:
- a first function indicative of a dependency of the quality of experience from the at least one configuration parameter and the number of service requests;
- a second function indicative of a dependency of the number of service requests from the quality of experience.

Preferably, the first and second functions provide said correlation between the quality of experience, the at least one configuration parameter and the number of service requests.

According to an embodiment, additional or alternative to any of the preceding embodiments, the monitoring module is further configured to monitor, preferably for each service of said plurality of services, a further number of service requests for at least one service different from said service. The self-organizing network module is preferably configured to determine said correlation also with respect to said further number of service requests.

According to an embodiment, additional or alternative to any of the preceding embodiments, the monitoring module is further configured to estimate a number of potential users potentially submitting to the telecommunication system access requests to access any of the plurality of services. The self-organizing network module is preferably configured to determine said correlation also with respect to said number of potential users.

According to an embodiment, additional or alternative to any of the preceding embodiments, the monitoring module is configured to estimate said number of potential users based on one or more statistical survey methodologies.

According to an embodiment, additional or alternative to any of the preceding embodiments, the at least one configuration parameter comprises at least one between radio resources dedicated by the telecommunication system to said service and radio resources shared by all the delivered services.

According to an embodiment, additional or alternative to any of the preceding embodiments, the at least one configuration parameter further comprises one or more radio resource management properties, such as scheduling priority, and/or processing capabilities of the telecommunication system dedicated to the delivery of the service.

According to an embodiment, additional or alternative to any of the preceding embodiments, the self-organizing network module is configured to determine, from said correlation, at least one between an equilibrium number of service requests and an equilibrium quality of experience. The self-organizing network module is preferably configured to determine said updated value of the at least one configuration parameter so that said target number of service requests corresponds to the equilibrium number of service requests or so that said target quality of experience corresponds to the equilibrium quality of experience.

According to an embodiment, additional or alternative to any of the preceding embodiments, said correlation is based on equations describing the dynamics of biological systems in which two or species interact with each other.

According to an embodiment, additional or alternative to any of the preceding embodiments, said correlation is based on the competitive Lotka-Volterra equations.

According to an embodiment, additional or alternative to any of the preceding embodiments, the monitoring module is configured to monitor said quality of experience by measuring at least one performance indicator of a quality of service associated with a delivery of said service by the telecommunication system.

According to an embodiment, additional or alternative to any of the preceding embodiments, said at least one performance indicator of the quality of service comprises at least one among delay time, average throughput, latency and jitter affecting data packets associated with the delivery of said service by the telecommunication system.

Another aspect of the present invention relates to a corresponding method. The method preferably comprises:
- monitoring, preferably for each service of a plurality of services provided by a telecommunication system, a number of service requests submitted by users of the telecommunication system to access said service, and preferably a quality of experience perceived by the users while using said service;
- based on a current value of at least one configuration parameter of the telecommunication system, and preferably on the monitored number of service requests and the monitored quality of experience, determine a correlation between the quality of experience, the at least one configuration parameter and the number of service requests;
- based on said correlation, and preferably on at least one between a target number of service requests submitted by users of the telecommunication system to access said service and a target quality of experience accepted to be perceived by the users while using said service, determine an updated value of the at least one configuration parameter, and
- command the telecommunication system to implement a reconfiguration thereof according to said updated value of the at least one configuration parameter

BRIEF DESCRIPTION OF THE ANNEXED DRAWINGS

These and other features and advantages of the present invention will be made apparent by the following description of some exemplary and non-limitative embodiments thereof; for its better intelligibility, the following description should be read making reference to the attached drawings, wherein.

DETAILED DESCRIPTION OF PREFERRED EMBODIMENTS OF THE INVENTION

Figure 1:
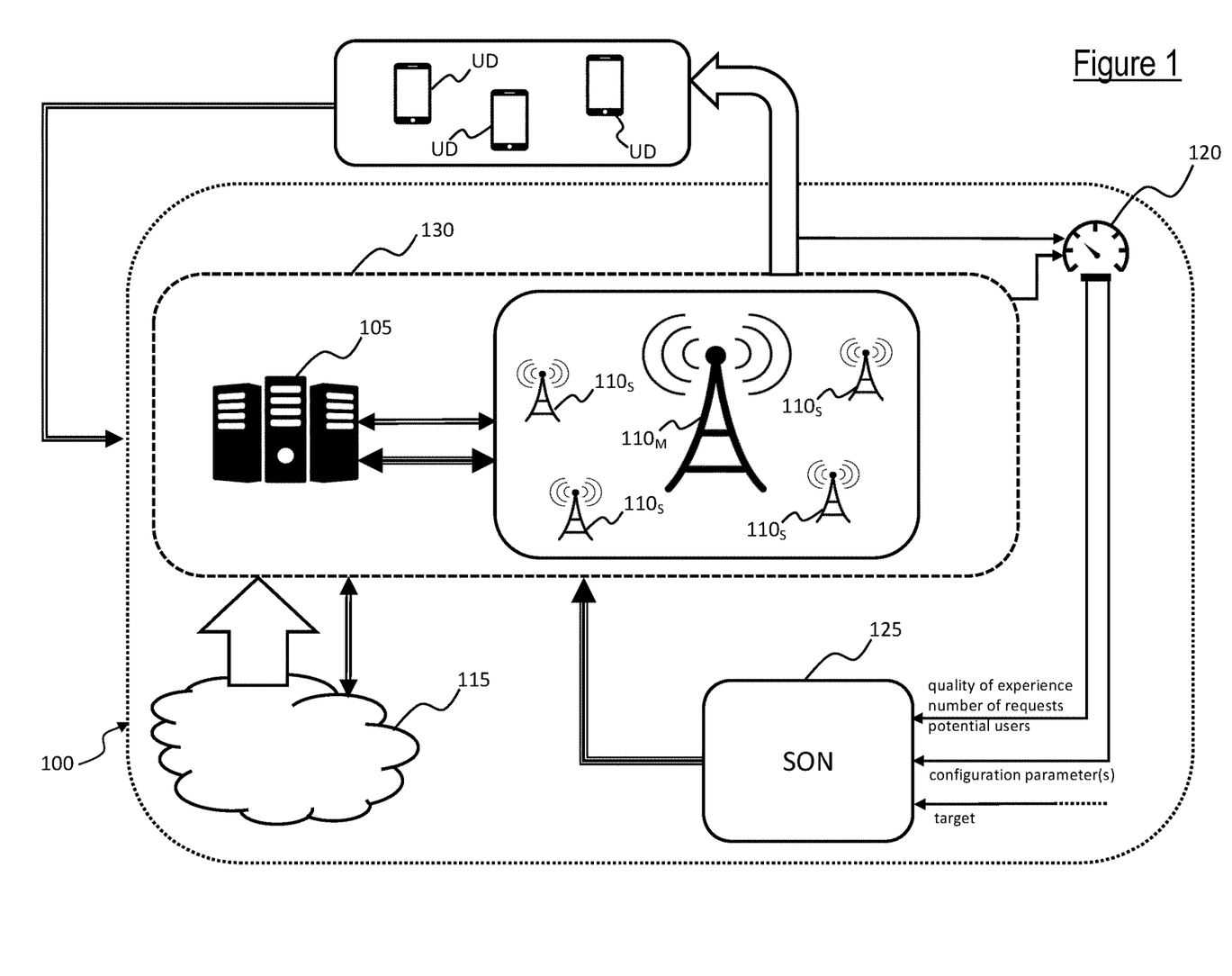
FIG. 1 shows a telecommunication system according to an embodiment of the present invention.

With reference to the drawings, FIG. 1 shows a telecommunication system 100 according an embodiment of the present invention.

The telecommunication system 100, either fixed, mobile, or hybrid, e.g. compliant with the 3GPP LTE/LTE-Advanced standard, may for example be an "Evolved Packet System" (hereinafter EPS system) 100, commonly referred to also as LTE "System Architecture Evolution" (SAE) system, although this should not construed limitatively.

In the following, only components of the telecommunication system 100 that are relevant for the understanding of the present invention will be shown and discussed.

The telecommunication system 100 comprises a core network 105. When considering an EPS system as the telecommunication system 100, the core network may for example be an IP-based core network, such as the "SAE"-based core network of the LTE system (or "Evolved Packet Core", described for example in the 3GPP Technical Specification TS 23.002).

The telecommunication system 100 is advantageously configured to deliver a number (e.g., a plurality) of services to one or more users of the telecommunication system 100. For the purposes of the present disclosure, the users are allowed to request, access and enjoy the services delivered by the telecommunication system 100 through respective user devices UD (including, but not limited to, mobile phones, smartphones, tablets, personal digital assistants or computers) connecting to the telecommunication system 100.

The services delivered by the telecommunication system 100 to the users (through the respective user devices UD) are not limiting for the present invention, and may differ from each other (as actually is in practical scenarios) for one or more service parameters including, but not limiting to, service duration, amount of data, quality, performance required to the telecommunication system, use of the radio resources of the telecommunication system, type of user device, type of user and type of content. Just as an example, the services delivered by the telecommunication system 100 to the users may comprise real-time communication sessions (such as a "Voice over LTE" (VoLTE) calls) and audio/video streaming.

Preferably, each user device UD is capable of accessing the telecommunication system 100 (and, hence, the services delivered by it) through a "Radio Access Technology" (hereinafter, RAT technology), or more thereof. Examples of RAT technologies are Bluetooth, Wi-Fi, 3G and 4G or LTE.

Another example of RAT technology through which the telecommunication system can be accessed by the user device(s) UD is the 5G technology: as better discussed in the following when discussing an embodiment of the present invention, the present invention may find further and advantageous application to vertical network slicing allowed by 5G technology.

When considering the EPS system as telecommunication system, the user devices UD are advantageously connected to the core network 105 over E-UTRAN (LTE radio access network), e.g. by means of one or more network nodes identifying a radio access network.

The network nodes (and, hence, the radio access network) may for example comprise a number of relatively high-power and wide-coverage transceiver stations (hereinafter, macro nodes), such as the macro node $110_M$, each one configured to provide radio coverage over a relatively wide geographic area (also referred to as macro cell) in order to allow connection of the user devices UD to the core network 105. In the exemplary illustrated embodiment, the telecommunication system 100 also comprises a number of lower-power, smaller coverage nodes (e.g., pico, micro, and/or femto nodes), in the following referred to as small nodes, such as the small nodes $110_S$, which are configured to provide radio coverage over relatively small geographic areas (also referred to as small cells) in order to allow connection of the user device UD to the core network 105 (e.g., directly or through an associated or pertaining macro node $110_M$).

In the following, the core network 105 and the radio access network $110_M, 110_S$ will be globally denoted as communication network 130, when distinguishing between the core network 105 and the radio access network $110_M, 110_S$ is not relevant for the understanding of the present invention.

The telecommunication system 100 preferably comprises one or more service networks, such as the service networks 115, each one configured to provide one or more of the services to be delivered to the users (through the communication network and the user devices UD connected to it). Without losing generality, the service networks 115, or at least a subset thereof, may for example be or comprise IP networks, such as "Packet Data Networks".

For the purposes of the present disclosure, the users are allowed to submit (through the respective user devices UD) service requests to the telecommunication system 100 (for accessing the services delivered by it). The service requests are graphically represented in FIG. 1 by double lines between the user devices UD and the telecommunication system 100; in order to conceptually illustrate signalling involved by the service requests, same double lines are also shown between the core network 105 and the radio access network $110_M, 110_S$, and between the communication network and the service networks 115.

In FIG. 1 a large arrow from the service networks 115 to the communication network represents an offered data traffic associated with the provided services, and a large arrow from the communication network to the user devices UD represents a disposed data traffic associated with the delivered services.

As visible in the figure, the arrow between the service networks 115 and the communication network is larger than the arrow between the communication network and the user devices UD. This difference in width is intended to conceptually distinguish between the data traffic that would be carried by an infinitely large pool of access resources (i.e., the offered data traffic), e.g. radio resources, and the amount or portion of the offered data traffic that, typically due to radio resource constraints, is actually handled or disposed by the communication network and delivered to the user devices UD for the fruition of the services (i.e., the disposed data traffic).

As visible in the figure, the telecommunication system 100 preferably comprises one or more monitoring modules, such as the monitoring module 120, for monitoring, for each delivered service, a quality of experience perceived by the users during use of the delivered service (see arrow between the disposed data traffic and the monitoring module 120), and one or more configuration parameters of the communication network while delivering the service (see arrow between the communication system 130 and the monitoring module 120).

Without losing generality, the configuration parameter(s) may comprise, for each service, one or more among access resources (such as radio resources) dedicated by the telecommunication system 100 to the service, and access resources (e.g., radio resources) shared by the delivered services. Additionally or alternatively, the configuration parameter(s) may comprise radio resource management policies (such as scheduling priority policies) and/or processing capabilities dedicated to the delivery of the service.

As will be understood from the following discussion, a reconfiguration of the telecommunication system 100 is allowed by acting (i.e., changing) the configuration parameter(s), or at least a subset thereof.

In the preferred, not limiting embodiment herein considered, the monitoring module 120 is configured to monitor the quality of experience by monitoring (i.e., measuring) one or more performance indicators of a quality of service associated with the delivery of the service; the performance indicator(s) of the quality of service may for example comprise one or more (preferably all) among delay time, average throughput, latency and jitter affecting data packets associated with the delivery of the service by the telecommunication system (i.e., the offered data traffic).

Therefore, in the example at issue, it is assumed that, during a relatively long time period (e.g. during a number of service sessions, i.e. during a number of fruitions of a same service by a user), the quality of service (i.e., the performance indicator(s) being measured during each service session) has a direct relationship with the quality of experience (i.e., the general quality perceived by the user while using that service): just as an example, in response to a protracted low performance of the service sessions experienced by the users (such as a video streaming that frequently stops), a low quality of the service perceived by the users may reasonably be expected.

In order to determine the performance indicator(s), and hence the quality of experience, the monitoring module 120 may be placed at any suitable "Point of Control and Observation" (PCO) of the telecommunication system 100; just as an example, the monitoring module 120 may be configured to monitor data exchanged between the radio access network $110_M, 110_S$ and one or more entities of the core network 105 (such as a "Serving Gateway" thereof, not shown), and/or to monitor the data exchanged between the Serving Gateway and other entities of the core network 105 (such as a "Mobility Management Entity" thereof, also not shown).

In the preferred, not limiting embodiment herein considered, the monitoring module 120 is configured to monitor the quality of experience by also monitoring, for each delivered service, a number of service requests submitted by the users of the telecommunication system 100 (through their own user devices UD) to access that service.

Indeed, the Applicant has understood that the service requests by the users may depend, other than on personal user interests, also on the quality of experience they perceive: particularly, in response to a low quality perceived by the users in respect of a service, an abandonment of that service provided by the telecommunication system, and particularly a reduction in the number of service requests for that service by the users, is reasonably to be expected.

In addition, the Applicant has also understood that the number of service requests in turn affects the performance indicators of the quality of service associated with the delivery of the services (especially in contexts in which the radio resources of the telecommunication system 100 are shared dynamically among the users performing service requests and/or using the delivered services), and hence the quality of experience; this translates into an interdependency (i.e., a reciprocal dependency) between the quality of experience and the number of service requests, so far not investigated.

This interdependency has been the starting point for the Applicant to devise a method for dynamically reconfiguring the telecommunication system 100, which will be discussed in the following.

According to an advantageous embodiment of the present invention, the monitoring module 120 is further configured to estimate a number of potential users potentially submitting to the telecommunication system 100 access requests (hereinafter, potential access requests) to access any of the services of (i.e., deliverable by) the telecommunication system 100.

According to an embodiment of the present invention, the monitoring module 120 is configured to estimate the number of potential users based on one or more statistical survey methodologies, such as marketing statistical survey methodologies or marketing researches. Examples of marketing researches include, but are not limited to, ad tracking, concept testing, customer satisfaction research, demand estimation, and segmentation research.

Additionally or alternatively, the monitoring module 120 is configured to estimate the number of potential users based on one or more user classes or categories in a predetermined or considered geographic area. Without losing generality, the user classes or categories may for example be determined based on the user device measurements and/or on one or more of the above mentioned marketing researches (or any other suitable marketing research).

Back to the figure, the telecommunication system 100 preferably comprises a "Self-Organizing Network" (SON) module 125, i.e. a processing module that, according to SON network principles, allows automating tuning or reconfiguring the telecommunication system 100 to maintain it in a desired operative condition over time.

The SON module 125 may be implemented by software (in which case, the resulting method or procedure, discussed in the following, for dynamically reconfiguring the telecommunication system 100 would be performed by proper code means included in a computer program, when the program is run on a computer), hardware, and/or a combination thereof. Moreover, the SON module 125 is illustrated in the figure as external to the communication network 130; however, as it should be understood, the SON module 125 may be physically located in the core network 105 (e.g., in one or more modules thereof) or in any other entity of the communication network 130 (e.g., in the radio access network 110$_M$,110$_S$), for example according to the implemented SON network architecture (e.g., distributed SON network, centralized SON network or hibrid SON network).

For the purposes of the present disclosure, the SON module 125 is configured to receive, from the monitoring module 120, for each delivered service, the quality of experience perceived by the users while using the service (in the example at issue, the performance indicators of the quality of service associated with the delivery of that service), the number of service requests submitted by the users to access the service, and a current value of the configuration parameter(s) of the telecommunication system 100, and to accordingly determine an updated value of the configuration parameter(s). In the advantageous embodiment herein considered, the SON module 125 is further configured to receive the number of potential users that may potentially submit potential service requests to access any of the services deliverable by the telecommunication system 100.

The quality of experience, the number of service requests, the current value of the configuration parameter(s) and the number of potential users are concisely indicated in FIG. 1 by the wording "quality of experience", "number of requests", "configuration parameter(s)" and "potential users", respectively.

According to such an updated value of the configuration parameter(s), the SON module 125 is preferably configured to command (e.g., through a proper reconfiguration command) the telecommunication system 100 to implement a reconfiguration thereof.

The reconfiguration command is graphically represented in FIG. 1 by a triple line between the SON module 125 and the communication network 130; in order to emphasize that the reconfiguration of the telecommunication system 100 may take place at radio access network level and/or at the core network level, the same triple line is also shown between the core network 105 and the radio access network 110$_M$,110$_S$.

For the purposes of the present disclosure, the SON module 125 is configured to receive (e.g., from a telecommunication system operator) a target number of service requests and/or a target quality of experience (the target number of service requests and/or the target quality of experience being concisely indicated in FIG. 1 by the wording "Target"); as will be understood from the following discussion, the target number of service requests and/or the target quality of experience allow defining the operative condition which is desired to be maintained for the telecommunication system 100. The target number of service requests and/or the target quality of experience may be chosen by the telecommunication system operator according to any design choice. Advantageously, the target number of service requests and/or the target quality of experience are variable over time (i.e., the telecommunication system operator may periodically or aperiodically provide to the SON module 125 any desired target number of service requests and/or any desired target quality of experience).

This could be the case of, for example, a telecommunications system operator that wants to take into consideration different time slots for different services (for example, services that are more likely to be requested in day time slots than in night time slots).

Additionally or alternatively, this could also be the case of, for example, a telecommunication system operator that wants to take into consideration different radio resources slots for different markets in a vertical market structure resulting from network slicing (as allowed, for example, by 5G technology). By vertical market structure is herein meant a market in which vendors offer goods and services specifically to an industry, trade, to professional customers, or to other group of customers with specialized needs: just as an example, different markets in a vertical market structure may comprise a telecommunication market (e.g. for allowing data traffic to be exchanged between user devices, such as for voice/video calls), a manufacturing market (e.g. for allowing data traffic to be exchanged between industrial machineries, such as industrial robots), and an automotive market (e.g. for allowing data traffic to be exchanged between smart or connected vehicles, such as self-driving cars). Without losing generality, other examples of vertical markets are banking, education, energy, financial, food and beverage, government, healthcare, legal, and transportation (travel). According to an embodiment of the present invention, in a telecommunication system comprising one or more such vertical markets, each vertical market could require specific setting and/or variability of the target number of service requests and/or of the target quality of experience, whereby the telecommunication system operator may provide to the SON module 125 any desired target number of service requests and/or any desired target quality of experience periodically (e.g., with a timing that is specific for the considered vertical market) or aperiodically (e.g., triggered by any event or condition that is specific for the considered vertical market).

As will be understood from the following discussion, the target number of service requests and/or the target quality of experience may for example be used by the SON module 125 to determine the updated value of the configuration parameter(s).

Figure 2:
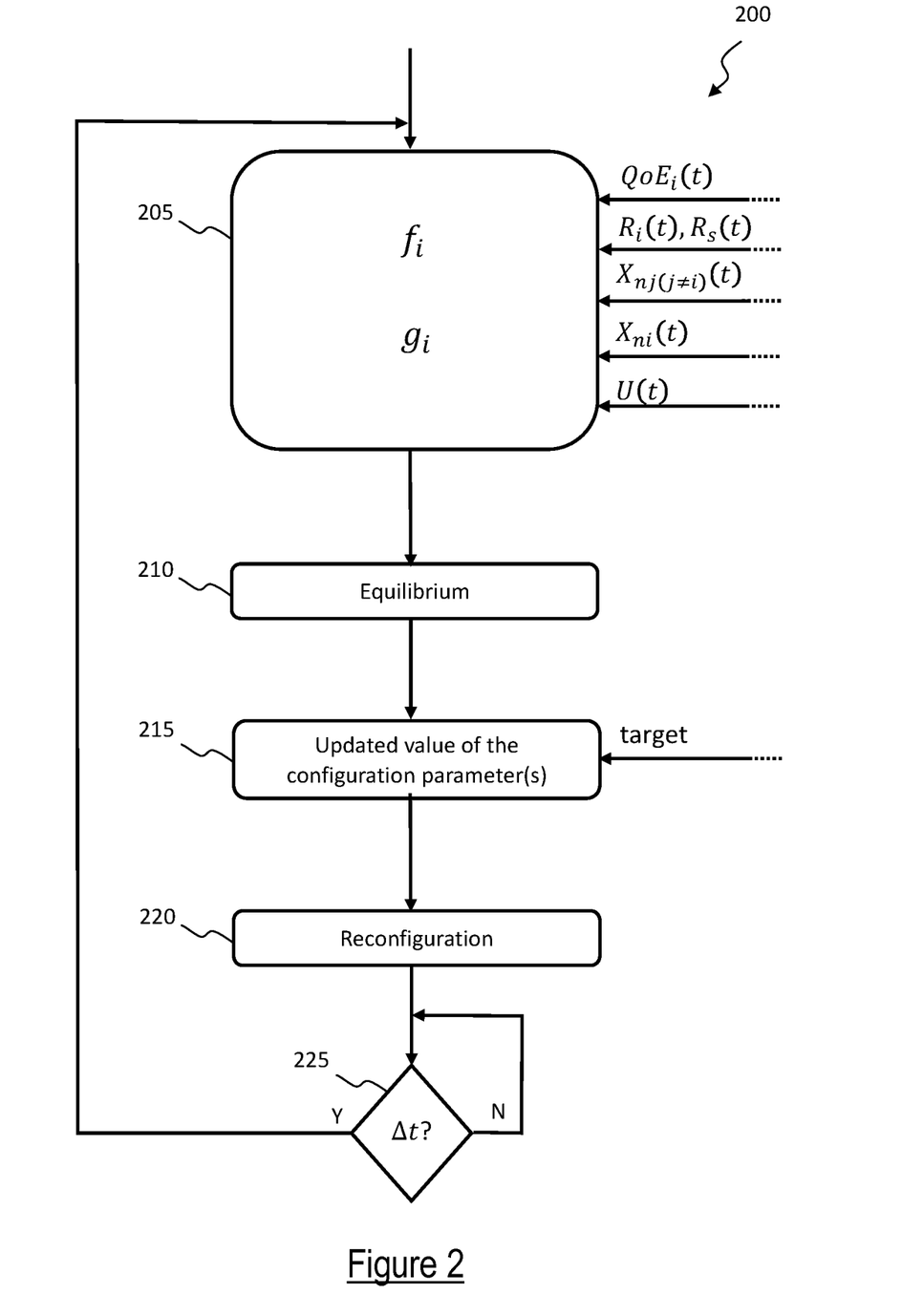
FIG. 2 shows an activity diagram of a method for reconfiguring the telecommunication system, according an embodiment of the present invention.

With joint reference to FIG. 2, an activity diagram is shown of a method 200 for dynamically reconfiguring the telecommunication system 100 according to an embodiment of the present invention.

The method 200 starts at action node 205, wherein, upon reception, for each considered service being delivered, of the quality of experience perceived by the users while using the service (in the example at issue, the performance indicators of the quality of service associated with the delivery of the service), the number of service requests submitted by the users to access the service, and a current value of the configuration parameter(s) of the telecommunication system 100, the SON module 125 is configured to determine a correlation between the quality of experience, the configuration parameter(s) and the number of service requests.

According to a preferred, not limiting embodiment of the present invention, the correlation between the quality of experience, the configuration parameter(s) and the number of service requests is achieved by determining a first function (hereinafter referred to as quality of experience function) indicative of a dependency of the quality of experience from the configuration parameter(s) and the number of service requests (the quality of experience function being thus indicative of how the configuration parameter(s) and the number of service requests associated with a service affect the quality of experience perceived during fruition of that service), and a second function (hereinafter referred to as service request function) indicative of a dependency of the number of service requests from the quality of experience (the service request function being thus indicative of how the quality of experience perceived during fruition of a service affects the number of service requests for that service).

As should be understood, the quality of experience function and the service request function, particularly their respective mutual dependencies, are expressions of the above-discussed interdependency between the quality of experience and the number of service requests.

According to a preferred embodiment of the present invention, the quality of experience function is determined based on the dependency of the quality of experience perceived by the users also from a number of service requests for one or more services (hereinafter, alternative services) different from (e.g., in competition with or alternative to) the considered service being delivered (the alternative services being for example a subset of the plurality of services deliverable by the telecommunication system 100): indeed, the Applicant has understood that the number of service requests by the users for one or more alternative services may depend, other than on personal user interests, also on the quality of experience perceived by the users for the considered service: for example, in response to a low quality of experience perceived by the users for a considered service, an abandonment of that service (and particularly a reduction in the number of service requests for accessing and using it) in favour of one or more alternative services (with corresponding increase in the number of service requests for accessing and using them) may reasonably be expected.

Therefore, in the preferred embodiment of the present invention the quality of experience may be expressed as:

$$\frac{dQoE_i(t)}{dt} = f_i(X_{ni}(t), R_i(t), R_s(t), X_{nj(j\neq i)}(t))$$

wherein:
QoE$_i$(t) is the average quality of experience perceived by the users accessing and using the i-th service (i.e., the considered service) delivered by the telecommunication system 100 at time instant t;
$f_i$ is the quality of experience function determined for the i-th service being delivered;
X$_{ni}$(t) is the number of service requests for the i-th service delivered by the telecommunication system 100 at time instant t;
R$_i$(t) are the radio resources dedicated by the telecommunication system 100 to the delivery of the i-th service at time instant t, R$_i$(t) thus representing the radio resources shared by the users while using the i-th service;
R$_s$(t) are the radio resources dedicated by the telecommunication system 100 to the delivery of the plurality of services at time instant t, R$_s$(t) thus representing the radio resources shared by the users while using the plurality of services delivered by the telecommunication system 100 (such as the considered service, i.e. the i-th service, and the alternative services);
X$_{nj(j\neq i)}$(t) is the number of service requests for the j-th alternative service (as mentioned above, an alternative service is different from the considered service, i.e. j≠i); as mentioned above, the dependency of the quality of experience perceived by the users also from X$_{nj(j\neq i)}$(t) may also be omitted in basic embodiments of the present invention.

According to a preferred embodiment of the present invention, the service request function is determined based on the dependency of the number of service requests also from the number of potential users potentially submitting to the telecommunication system 100 the potential access requests to access any of the services deliverable by the telecommunication system 100: indeed, the Applicant has understood that the number of service requests for accessing the i-th service depends on the number of potential users potentially willing to access any of the plurality of services of (i.e., deliverable by) the telecommunication system 100: for example, in response to an increase in the number of potential users (and, presumably, of potential access requests to access any of the services deliverable by the telecommunication system 100), an increase in the number of service requests to access the i-th service may be reasonably expected.

Therefore, in the preferred embodiment of the present invention, the number of service requests may be generally expressed as:

$$\frac{dX_{ni}(t)}{dt} = g_i(QoE_i(t), U(t))$$

wherein:
- $X_{ni}(t)$ is the number of service requests for the i-th service delivered by the telecommunication system 100 at time instant t;
- $g_i$ is the service request function determined for the i-th service being delivered;
- $QoE_i(t)$ is the average quality of experience perceived by the users accessing and using the i-th service (i.e., the considered service) delivered by the telecommunication system 100 at time instant t;
- $U(t)$ is the number of potential users potentially submitting to the telecommunication system 100 the potential service requests to access any of the services deliverable by the telecommunication system 100; as mentioned above, the dependency of the number of service requests also from $U(t)$ may be omitted in basic implementations of the present invention.

According to an embodiment of the present invention, the quality of experience function $f_i$ and/or the service request function $g_1$ may be numerically generated or built or defined based on one or more variables being monitored by the monitoring module 120 (such as the quality of experience, the configuration parameter(s), the number of service requests and the number of potential users).

According to an alternative embodiment of the present invention, the quality of experience function $f_1$ and/or the service request function $g_1$ may be determined based on a characterization of a proper modelling function. For the purposes of the present disclosure, by characterization of a modelling function is herein intended the determination of values of one or more coefficients of a function or set of functions identified as being suitable to model the quality of experience with respect to the configuration parameter(s) and the number of service requests (and, preferably, with respect also to the number of service requests for one or more alternative services, as discussed above), and/or the number of service requests with respect to the quality of experience (and, preferably, with respect also to the number of potential users, as discussed above).

Although in the foregoing the correlation between the quality of experience, the configuration parameter(s) and the number of service requests has been discussed as expressible by two distinct functions (i.e., quality of experience function and service request function), the discussion of distinct functions is merely aimed at conceptually illustrating the interdependency between the quality of experience and the number of service requests. Indeed, the principles of the present invention equivalently apply when considering more than two distinct functions, or even when considering a single function: just as an example, by combining the above quality of experience equation and the above number of service request equation, a single equation, such as a single differential equation having the quality of experience as unknown quantity, may be obtained:

$$\frac{dQoE_i(t)}{dr} = f_i(g_i(QoE_i(t), U(t)), R_i(t), R_s(t), X_{nj(j\neq i)}(t))$$
$$= h_i(QoE_i(t), U(t), R_i(t), R_s(t), X_{nj(j\neq i)}(t))$$

wherein $h_i$ is a combined function conceptually resulting by combination between the quality of experience function $f_i$ and the service request function $g_i$ (in any case, a single equation having the number of service requests as unknown quantity could also be obtained).

As will be understood from the following discussion of a practical example, the modelling function may be used to model the correlation between the quality of experience, the configuration parameter(s) and the number of service requests when they are expressed with a single equation (in which case the modelling function may for example be used to model the combined function $h_i$) or with multiple equations (in which case the modelling function may for example be used to model the quality of experience function $f_i$ or the service request function $g_i$).

According to an embodiment of the present invention, the modelling function for modelling the correlation between the quality of experience, the configuration parameter(s) and the number of service requests is based on equations describing the dynamics of biological systems in which two or more species interact with each other, such as the competitive Lotka-Volterra (predator-prey) equations.

The competitive Lotka-Volterra equations represent a simple model of population dynamics of species, wherein the interaction between the species is their competition for some common resource (one specie interacting as a predator and the other as a prey). In the example at issue, the access requests to different services sharing (e.g., during their delivery) the same radio resources may be regarded as competing populations. In this respect, the competitive Lotka-Volterra equations may be written as follows:

$$\begin{cases} \frac{dx_1}{dt} = x_1 \cdot R_1 \cdot \left(1 - \frac{\beta_1}{K_1} \cdot x_1 - \frac{\alpha_{12}}{K_1} \cdot x_2\right) \\ \frac{dx_2}{dt} = x_2 \cdot R_2 \cdot \left(1 - \frac{\beta_2}{K_2} \cdot x_2 - \frac{\alpha_{21}}{K_2} \cdot x_1\right) \end{cases}$$

wherein:
- $x_1$ and $x_2$ are the number of service requests to access first and second services, respectively, at time instant t, the first and second service being different from each other and sharing the same radio resources. In the analogy of the dynamics of biological systems, the numbers of service requests $x_1$ and $x_2$ represent the competing populations.

$$\frac{dx_1}{dt} \text{ and } \frac{dx_2}{dt}$$

represent the instantaneous growth rates of the populations $x_1$ and $x_2$ at time instant t;
- $R_1$ and $R_2$ are the inherent per-capita growth rates of the populations $x_1$ and $x_2$;
- $K_1$ and $K_2$ are the carrying capacities associated with the populations $x_1$ and $x_2$. The carrying capacity of a biological species in an environment is the maximum population size of the species that the environment can sustain indefinitely, given the food, habitat, water, and other necessities available in the environment. In population biology, carrying capacity is defined as the environment's maximal load. In the example at issue of access requests to services of the telecommunication system 100 as populations, $K_1$ and $K_2$ may be regarded as the maximum sizes of the access requests to the first and second services that the telecommunication system 100 can sustain or satisfy, e.g. based on physical or structural or technological constraints of the telecommunication system 100 (such as the radio resources available in the telecommunication system 100);

$\alpha_{12}$ and $\alpha_{21}$ are non-negative parameters representing, respectively, the effect that the population $x_2$ has on the population $x_1$, and the effect that population $x_1$ has on the population $x_2$, and $\beta_1$ and $\beta_2$ are non-negative parameters.

Although two competitive Lotka-Volterra equations (each one for each population) have been considered, a system of three or more competitive Lotka-Volterra equations may be envisaged when considering three or more populations (indeed, it can be proven that the model described by the competitive Lotka-Volterra may be generalized to any number of species competing against each other).

In addition, although the competitive Lotka-Volterra equations have been considered by way of example only, other equations describing the dynamics of biological systems in which two or more species interact with each other may be used. Just as an example, the Nicholson-Bailey model could be used, which describes the population dynamics of a coupled host-parasitoid system.

Back to the competitive Lotka-Volterra equations of above, in order to characterize the modelling function, the parameters $\alpha_{12}$, $\alpha_{21}$, $\beta_1$ and $\beta_2$ (or at least a subset thereof) as a function of the configuration parameter(s) are preferably determined. The parameters $\alpha_{12}$, $\alpha_{21}$, $\beta_1$ and $\beta_2$ (or at least a subset thereof) as a function of the configuration parameter(s) are preferably determined experimentally (i.e. by tracking variations over time of the populations $x_1$, $x_2$ according to changes in the monitored and measured variables).

Depending on the monitored and measured variables, the above Lotka-Volterra equations may be used to determine one or more among:

the quality of experience function $f_i$ for the i-th service delivered by the telecommunication system 100 (in which case the monitored and measured variables may comprise the average quality of experience $QoE_i(t)$ perceived by the users accessing and using the i-th service, the number of service requests $X_{ni}(t)$ for the i-th service, the radio resources $R_i(t)$, $R_s(t)$, and, preferably, the number of service requests $X_{nj(j\neq i)}(t)$ for one or more alternative services);

the service request function $g_i$ for the i-th service delivered by the telecommunication system 100 (in which case the monitored and measured variables may comprise the average quality of experience $QoE_i(t)$ perceived by the users accessing and using the i-th service and, preferably, the number of potential users (U(t)), and the combined function $h_i$ of the differential equation having the number of service requests as unknown quantity (in which case the monitored and measured variable may comprise the number of service requests $X_{ni}(t)$, the configuration parameter(s) (such as the radio resources $R_i(t)$, $R_s(t)$), and, preferably, the number of service requests $X_{nj(j\neq i)}(t)$ for one or more alternative services and/or the number of potential users U(t)).

Back to the activity diagram of FIG. 2, the method 200 preferably comprising determining, from said correlation, at least one between an equilibrium number of service requests and an equilibrium quality of experience (action node 210), and to determine the updated value of the configuration parameter(s) accordingly (action node 215). For the purposes of the present disclosure, by equilibrium number of service requests it is herein meant a condition where the number of service requests to access each service does not change over time, and by equilibrium quality of experience it is herein meant a condition where the quality of experience perceived by the users for each delivered service does not change over time—when considering the general equations expressing the correlation between the quality of experience, the configuration parameter(s) and the number of service requests, the equilibrium number of service requests and the equilibrium quality of experience is obtained when the derivatives $$\frac{dQoE_i(t)}{dt} \text{ and } \frac{dX_{ni}(t)}{dt}$$

are equal to 0.

As should be understood, the use of the equilibrium number of service requests and/or of the equilibrium quality of experience may depend, in general, on the number of equations used to express the correlation between the quality of experience, the configuration parameter(s) and the number of service requests: in the general example of two functions expressing such a correlation (i.e., the quality of experience function $f_i$ and the service request function $g_i$) both the equilibrium number of service requests and the equilibrium quality of experience are preferably used (for example, in order to result in a system of m equations in m unknowns, where the m unknowns are (or are indicative of) the value, i.e. the updated value, of the configuration parameter(s) to be used in the reconfiguration of the telecommunication system 100).

Preferably, the updated value of the configuration parameter(s) is determined by setting the equilibrium number of service requests at said target number of service requests and/or the equilibrium quality of experience at said target quality of experience.

Back to the above example of the competitive Lotka-Volterra equations, population equilibrium occurs when neither of the population levels is changing, i.e. when both of the derivatives are equal to 0. It can be shown that two equilibrium points are admitted.

The first equilibrium point is the point $(x_1, x_2)=(0, 0)$, and represents the extinction of both species: in the considered scenario of telecommunication system as a biological system, the first equilibrium point $(x_1, x_2)=(0, 0)$ represents the absence of service requests.

The second equilibrium point is given by:

$$x_1 = \frac{K_1 \cdot \beta_2 - K_2 \cdot \alpha_{12}}{\beta_1 \cdot \beta_2 - \alpha_{12} \cdot \alpha_{21}}$$

$$x_2 = \frac{K_2 \cdot \beta_1 - K_1 \cdot \alpha_{21}}{\beta_1 \cdot \beta_2 - \alpha_{12} \cdot \alpha_{21}}$$

and represents a fixed point (or set of points) at which both populations sustain (theoretically, indefinitely) their current, non-zero numbers: in the considered scenario of telecommunication system as a biological system, the second equilibrium point represents a stationary number of service requests.

In the example at issue, the updated value of the configuration parameter(s) is preferably determined by setting the equilibrium number of service requests (i.e., the second equilibrium point) at the target number of service requests, whereby the parameter(s) of the Lotka-Volterra equations (such as the parameters $\beta_1$ and $\beta_2$), and hence the configuration parameter(s) depending thereof (such as the radio resources $R_i(t)$, $R_s(t)$) may be determined.

As mentioned above, according to such an updated value of the configuration parameter(s), the SON module 125 is preferably configured to command (e.g., through the proper reconfiguration command) the telecommunication system 100 to implement a reconfiguration thereof (action node 220), whereby the telecommunication system 100 is allowed to operate with a stabilized behavior on the desired number of service requests.

According to a preferred, not limiting, embodiment of the present invention, the method 200 is repeated as such every predefined time interval $\Delta t$. This is conceptually shown in FIG. 2 by loop connection between decision node 225 and the action node 205; particularly, if (exit branch Y of the decision node 225) the predefined time interval $\Delta t$ has elapsed, the steps 205-220 are repeated as such, otherwise (exit branch N of the decision node 225) no actions are taken until the predefined time interval $\Delta t$ has elapsed (as conceptually represented in the figure by loop connection between exit branch N of the decision node 225 and the input branch thereof).

The predefined time interval may for example be chosen according to proper design options. Just as an example, the predefined time interval $\Delta t$ can be long enough to allow the monitoring module 120 to monitor and measure, for each service, the variables over a high or relatively high number of service sessions.

Naturally, in order to satisfy local and specific requirements, a person skilled in the art may apply to the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

More specifically, the present invention lends itself to be implemented through an equivalent method (by using similar steps, removing some steps being not essential, or adding further optional steps); moreover, the steps may be performed in different order, concurrently or in an interleaved way (at least partly).

The invention claimed is:

1. A telecommunication system configured to deliver a plurality of services, the telecommunication system comprising:
   a monitoring module, implemented using monitoring circuitry, configured to monitor, for each service of said plurality of services, a number of service requests ($X_{ni}(t)$) submitted by users of the telecommunication system to access said service, and a quality of experience ($QoE_i(t)$) perceived by the users while using said service; and
   a self-organizing network module, implemented using network circuitry, configured to:
      based on a current value of at least one configuration parameter ($R_i(t)$,$R_s(t)$) of the telecommunication system, and on the monitored number of service requests ($X_{ni}(t)$) and the monitored quality of experience ($QoE_i(t)$), determine a correlation ($f_i$,$g_i$) among the quality of experience ($QoE_i(t)$), the at least one configuration parameter ($R_i(t)$,$R_s(t)$) and the number of service requests ($X_{ni}(t)$), said correlation being based on a number of service requests to access each service, a growth rate of the number of service requests to access each service, and an instantaneous growth rate of the number of service requests to access each service,
      determine from said correlation, at least one between:
         an equilibrium number of service requests indicative of a condition where the number of service requests to access each service does not change over time, and
         an equilibrium quality of experience indicative of a condition where the quality of experience perceived by the users for each delivered service does not change over time,
      based on said correlation, and on at least one of a target number of service requests submitted by users of the telecommunication system to access said service and a target quality of experience accepted to be perceived by the users while using said service, determine an updated value of the at least one configuration parameter ($R_i(t)$,$R_s(t)$), and
      command the telecommunication system to implement a reconfiguration thereof according to said updated value of the at least one configuration parameter ($R_i(t)$,$R_s(t)$).

2. The telecommunication system according to claim 1, wherein the self-organizing network module is configured to determine:
   a first function ($f_i$) indicative of a dependency of the quality of experience ($QoE_i(t)$) from the at least one configuration parameter ($R_i(t)$, $R_s(t)$) and the number of service requests ($X_{ni}(t)$);
   a second function ($g_i$) indicative of a dependency of the number of service requests ($X_{ni}(t)$) from the quality of experience ($QoE_i(t)$), and
   the first ($f_i$) and second ($g_i$) functions providing said correlation between the quality of experience ($QoE_i(t)$), the at least one configuration parameter ($R_i(t)$, $R_s(t)$) and the number of service requests ($X_{ni}(t)$).

3. The telecommunication system according to claim 1, wherein the monitoring module is further configured to monitor, for each service of said plurality of services, a further number of service requests ($X_{nj(j \neq i)}(t)$) for at least one service different from said service, the self-organizing network module being configured to determine said correlation ($f_i$) also with respect to said further number of service requests ($X_{nj(j \neq i)}(t)$).

4. The telecommunication system according to claim 1, wherein the monitoring module is further configured to estimate a number of potential users ($U(t)$) potentially submitting to the telecommunication system access requests to access any of the plurality of services, the self-organizing network module being configured to determine said correlation ($g_i$) also with respect to said number of potential users ($U(t)$).

5. The telecommunication system according to claim 4, wherein the monitoring module is configured to estimate said number of potential users (U(t)) based on one or more statistical survey methodologies.

6. The telecommunication system according to claim 1, wherein the at least one configuration parameter comprises at least one between radio resources ($R_i(t)$) dedicated by the telecommunication system to said service and radio resources ($R_s(t)$) shared by all the delivered services.

7. The telecommunication system according to claim 1, wherein the at least one configuration parameter further comprises one or more radio resource management properties, such as scheduling priority, and/or processing capabilities of the telecommunication system dedicated to the delivery of the service.

8. The telecommunication system according to claim 1, wherein the self-organizing network module is configured to determine, from said correlation, at least one between an equilibrium number of service requests and an equilibrium quality of experience, and to determine said updated value of the at least one configuration parameter ($R_i(t),R_s(t)$) so that said target number of service requests corresponds to the equilibrium number of service requests or so that said target quality of experience corresponds to the equilibrium quality of experience.

9. The telecommunication system according to claim 1, wherein the monitoring module is configured to monitor said quality of experience ($QoE_i(t)$) by measuring at least one performance indicator of a quality of service associated with a delivery of said service by the telecommunication system.

10. The telecommunication system according to claim 9, wherein said at least one performance indicator of the quality of service comprises at least one among delay time, average throughput, latency and jitter affecting data packets associated with the delivery of said service by the telecommunication system.

11. The telecommunication system according to claim 1, wherein said equilibrium number of service requests and said equilibrium quality of experience are determined from said correlation when a derivative of said number of service requests ($X_{ni}(t)$) and a derivative of said monitored quality of experience ($QoE_i(t)$) are equal to 0.

12. A method comprising:

monitoring, for each service of a plurality of services provided by a telecommunication system, a number of service requests ($X_{ni}(t)$) submitted by users of the telecommunication system to access said service, and a quality of experience ($QoE_i(t)$) perceived by the users while using said service;

based on a current value of at least one configuration parameter ($R_i(t),R_s(t)$) of the telecommunication system, and on the monitored number of service requests ($X_{ni}(t)$) and the monitored quality of experience ($QoE_i(t)$), determine a correlation ($f_i,g_i$) among the quality of experience ($QoE_i(t)$), the at least one configuration parameter ($R_i(t),R_s(t)$) and the number of service requests ($X_{ni}(t)$), said correlation being based on a number of service requests to access each service, a growth rate of the number of service requests to access each service, and an instantaneous growth rate of the number of service requests to access each service;

determining from said correlation, at least one between:

an equilibrium number of service requests indicative of a condition where the number of service requests to access each service does not change over time, and an equilibrium quality of experience indicative of a condition where the quality of experience perceived by the users for each delivered service does not change over time;

based on said correlation, and on at least one of a target number of service requests submitted by users of the telecommunication system to access said service and a target quality of experience accepted to be perceived by the users while using said service, determining an updated value of the at least one configuration parameter ($R_i(t),R_s(t)$); and commanding the telecommunication system to implement a reconfiguration thereof according to said updated value of the at least one configuration parameter ($R_i(t),R_s(t)$).

13. The method according to claim 12, wherein said equilibrium number of service requests and said equilibrium quality of experience are determined from said correlation when a derivative of said number of service requests ($X_{ni}(t)$) and a derivative of said monitored quality of experience ($QoE_i(t)$) are equal to 0.

* * * * *